Sept. 3, 1940.                    R. ELMS                    2,213,462
                              DATE INDICATOR
                         Filed Dec. 14, 1936              8 Sheets-Sheet 1
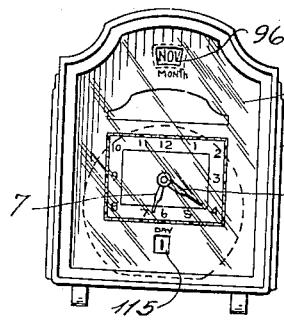
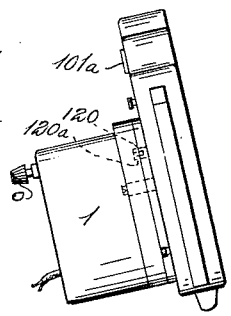
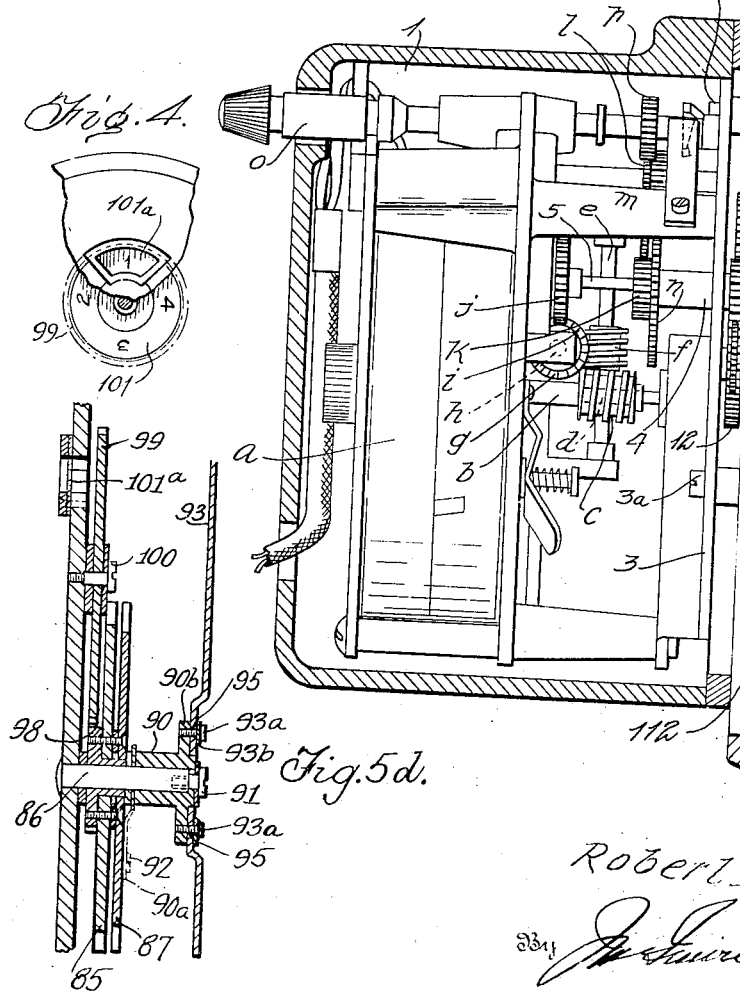
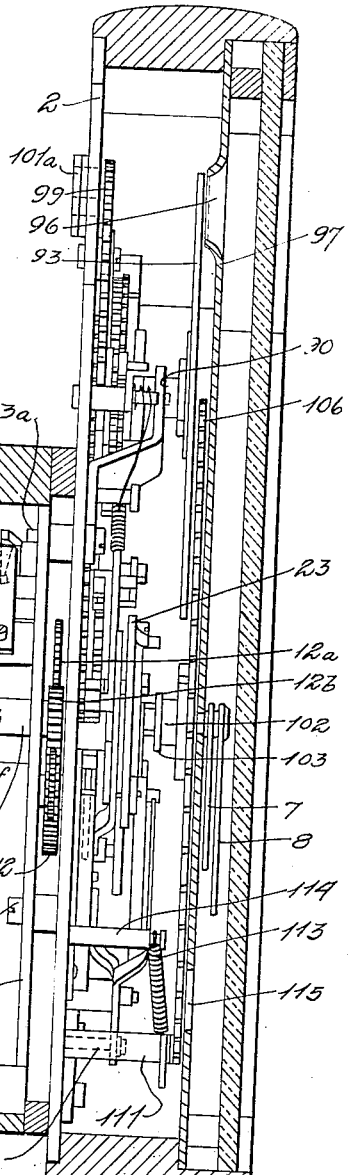
Inventor
Robert Elms,
By
Attorney Sept. 3, 1940.  R. ELMS  2,213,462
DATE INDICATOR
Filed Dec. 14, 1936  8 Sheets-Sheet 3
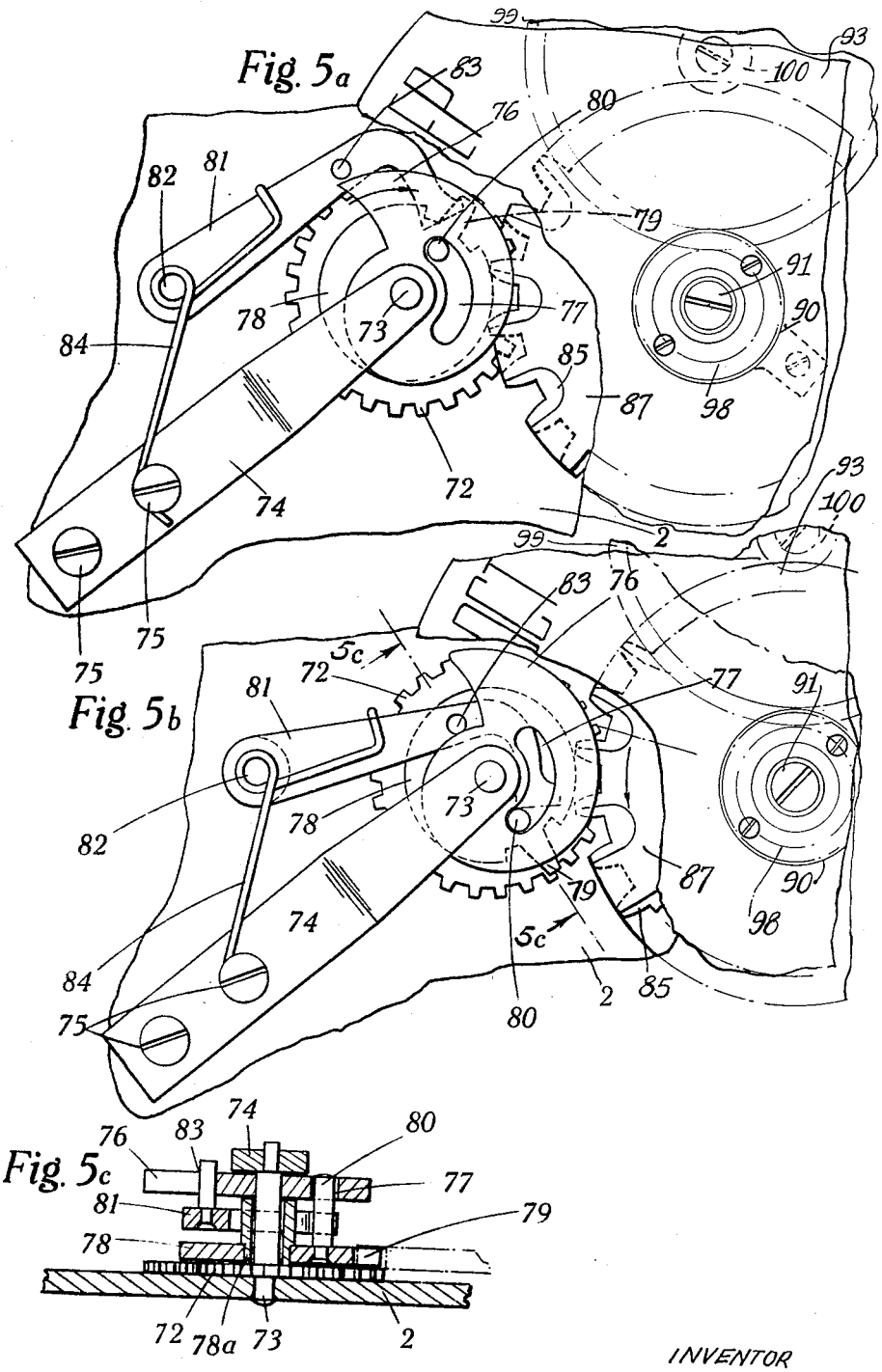
INVENTOR
Robert Elms
BY
ATTORNEY Sept. 3, 1940.   R. ELMS   2,213,462
DATE INDICATOR
Filed Dec. 14, 1936   8 Sheets-Sheet 4

INVENTOR
Robert Elms
BY
ATTORNEY

Sept. 3, 1940.  R. ELMS  2,213,462
DATE INDICATOR
Filed Dec. 14, 1936  8 Sheets-Sheet 5

INVENTOR
Robert Elms
BY
ATTORNEY

Sept. 3, 1940.  R. ELMS  2,213,462
DATE INDICATOR
Filed Dec. 14, 1936  8 Sheets-Sheet 7

INVENTOR
Robert Elms
BY
ATTORNEY

Sept. 3, 1940.                    R. ELMS                       2,213,462
                               DATE INDICATOR
                          Filed Dec. 14, 1936            8 Sheets-Sheet 8
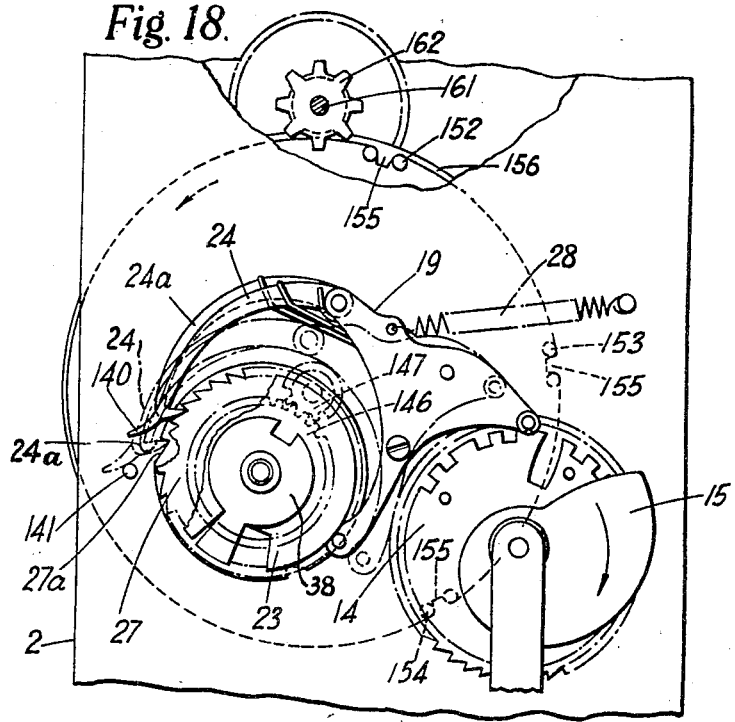
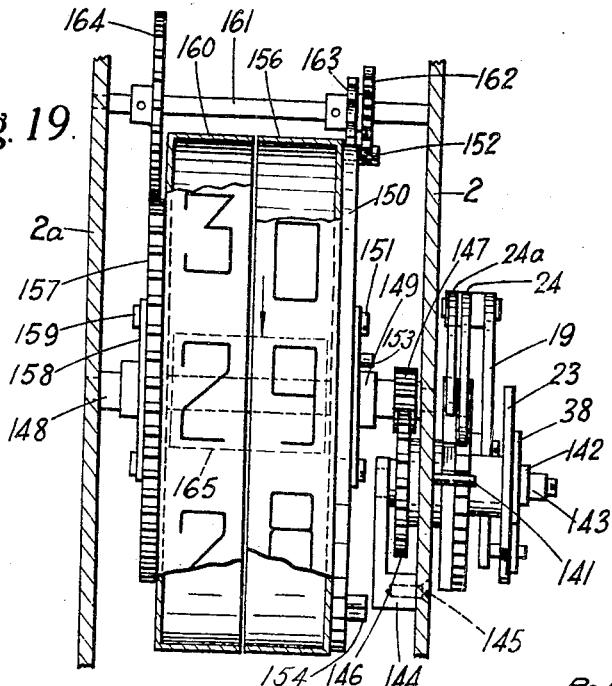
INVENTOR
Robert Elms
BY
ATTORNEY Patented Sept. 3, 1940

2,213,462

UNITED STATES PATENT OFFICE 2,213,462

DATE INDICATOR

Robert Elms, London, England

Application December 14, 1936, Serial No. 115,851
In Great Britain December 23, 1935

23 Claims. (Cl. 58—5)

My invention relates to date indicators, and is especially applicable to clocks.

My invention has for its object to provide an improved form of date indicator mechanism.

My invention consists in the combinations of parts set forth in the claims appended hereto.

Referring now to the accompanying drawings, Figure 1 shows a front elevation of a clock with which my invention is incorporated, while Figure 2 shows a side elevation.

Figure 3 shows a sectional elevation of the clock shown in Figures 1 and 2.

Figure 4 shows a detail of the rear window for use in setting the date indicator mechanism.

Figure 5a shows a detail view of the trip mechanism for the months dial just before being tripped, while Figure 5b shows the mechanism after being tripped.

Figure 5c shows a section through the line 5c—5c on Figure 5b.

Figure 5d shows a section through the line 5d—5d on Figure 5.

Figure 18 shows a front elevation of a further modified form of date indicator mechanism, in which the day of the month is indicated by number wheels.

Figure 19 shows a side elevation partly in section of the mechanism shown in Figure 18.

Figure 5:
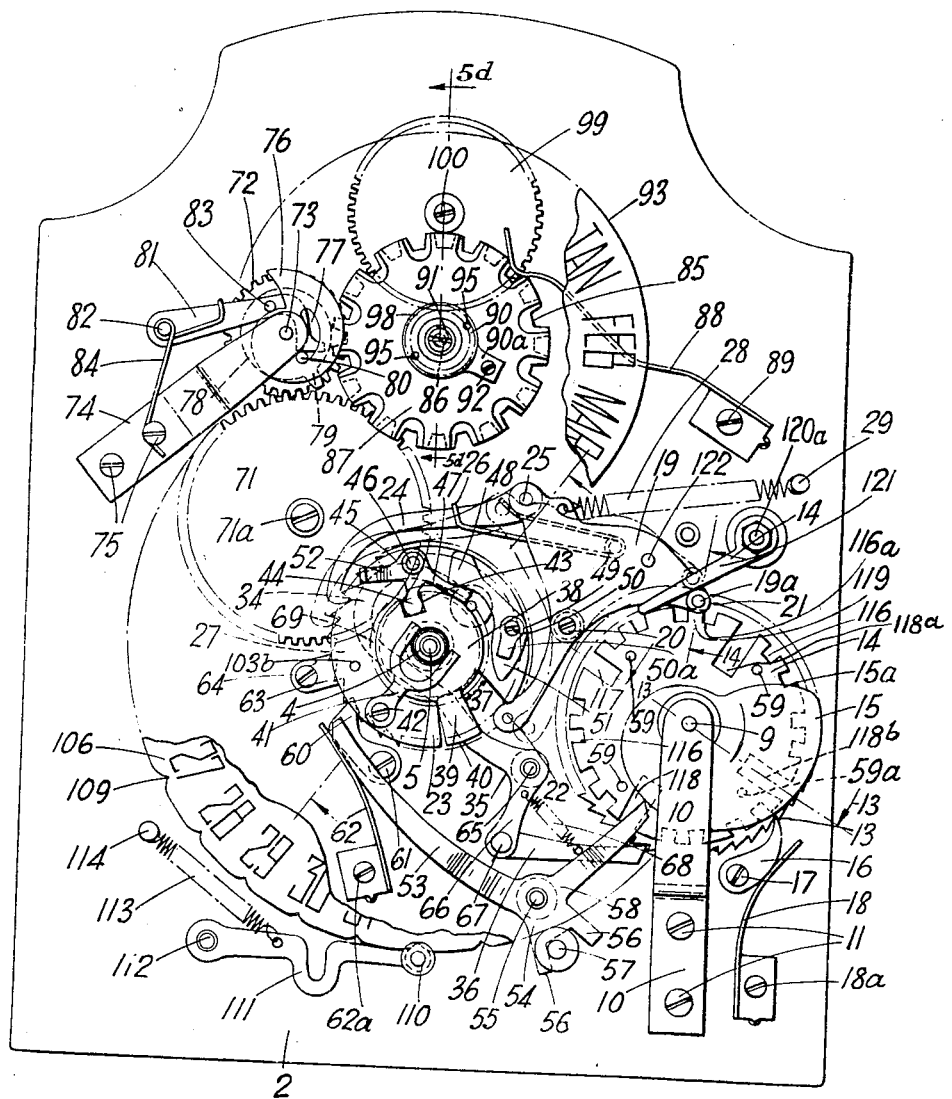
Figure 5 shows a front elevation of the date indicator mechanism with the months dial and days of the month dial partially removed.

In carrying my invention into effect, according to one form and as applied by way of example to an electrically driven clock 1, Figures 1, 2 and 3, arranged to indicate the month and the day of the month, I arrange a plate 2, Figures 3 and 5, in front of the front plate 3 of the clock mechanism, and rigidly attach these plates together by means of screws 3a. The hour-hand sleeve, 4, Figures 5 and 12, through which the minute-hand spindle 5 extends, passes through a sleeve 6 rigidly attached to the plate 2. The hour-hand 7 is attached to the front end of the sleeve 4, while the minute-hand 8 is attached to the front end of the spindle 5.

The minute-hand spindle 5 is adapted to be driven by the synchronous motor $a$ through a spindle $b$, worm $c$, worm wheel $d$, spindle $e$, worm $f$, worm wheel $g$, spindle $h$, worm $i$, and a worm wheel $j$, while the hour-hand sleeve 4 is driven from the spindle 5 through the pinion $k$, toothed wheel $l$, pinion $m$ and toothed wheel $n$. A spindle $o$ for setting the hands is slidably mounted and carries a toothed wheel $p$ which by pushing the spindle inwards against the action of a spring (not shown) may be brought into engagement with the toothed wheel $l$. The clock mechanism just described is known.

Figure 13:
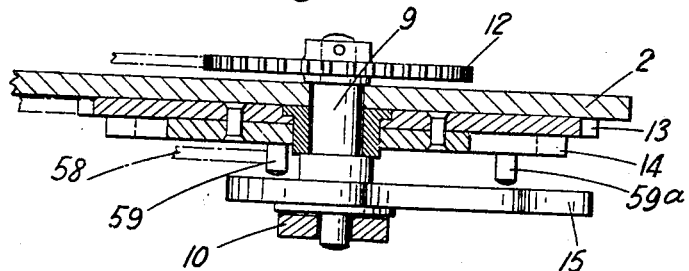
Figure 13 shows a section through the line 13—13 on Figure 5.
Figure 14:
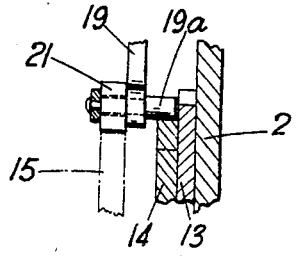
Figure 14 shows a section through the line 14—14 on Figure 5.

To the right and slightly below the sleeve 4 and spindle 5 for the hands 7 and 8, I mount a spindle 9, Figures 5 and 13, in the plate 2 and also in a bracket 10 attached to the front of this plate by means of screws 11, so that the spindle 9 is rotatably mounted in these parts. The spindle 9, which drives the date indicator mechanism, projects beyond the rear face of the plate 2 and on the projecting portion has a toothed wheel 12, Figures 3 and 13, rigidly mounted thereon. The toothed wheel 12 is driven from the hour-hand sleeve 4 through the toothed wheels 12a and 12b the gear ratio being such that the date indicator drive spindle 9 makes one revolution in every 24 hours. Between the plate 2 and the bracket 10 a ratchet wheel 13, Figures 5 to 11 and 13 and 14, having 48 teeth is loosely mounted on the date indicator drive spindle 9, and to this ratchet wheel is rigidly attached a disc 14 having notches in its periphery, the function of which will be hereinafter described. In front of the notched disc 14 a snail 15 is rigidly mounted on the date indicator drive spindle 9. A detent 16 is pivotally mounted on a pin 17 screwed into the plate 2 and is held in contact with the teeth of the ratchet wheel 13 by a spring 18 fixed to the plate 2 by means of a screw 18a, Figure 5. The detent 16 prevents backward movement of the wheel 13.

A rocker 19, Figures 5 to 8, is pivotally mounted on a pin 20 screwed into the plate 2. The rocker 19 is provided with a pin 19a, Figure 14 which projects from both sides of the rocker, one end of this pin being adapted to co-act with the periphery of the notched disc 14, while the other end of the pin is provided with a roller 21 and co-acts with the snail 15 on the date indicator drive spindle 9. The rocker 19 is also provided with a second pin 22 which senses the periphery of a variable gap disc 23, Figures 5 and 12, hereinafter described. A driving pawl 24 is pivotally mounted on a pin 25 fixed to the rocker 19 and this pawl is provided with a spring 26 which maintains it in contact with a ratchet wheel 27 provided with 31 teeth. To the rocker 19 is connected one end of a tension spring 28 which at its other end is connected to a pin 29 fixed to the plate 2 so that the action of this spring tends to maintain the pin 19a on the rocker in contact with the periphery of the notched disc 14 and also the sensing pin 22 on the rocker in contact with the gap disc 23.

Figure 11:
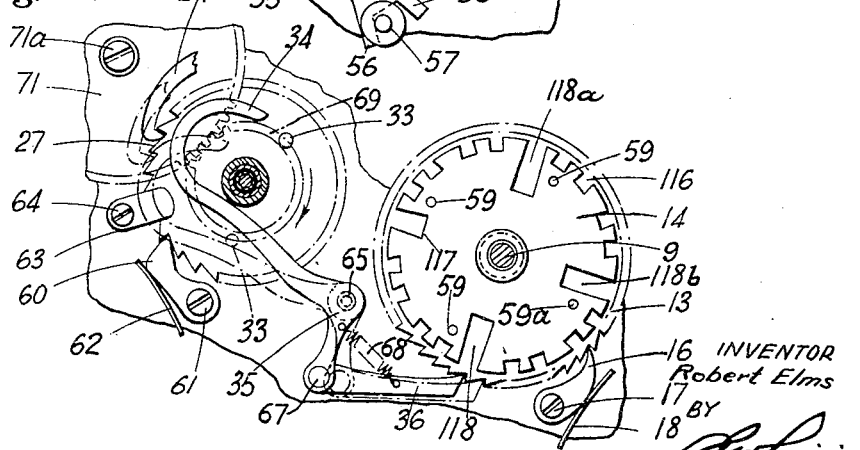
Figure 11 shows a detail view of the the mechanism for operating the notched disc.
Figure 12:
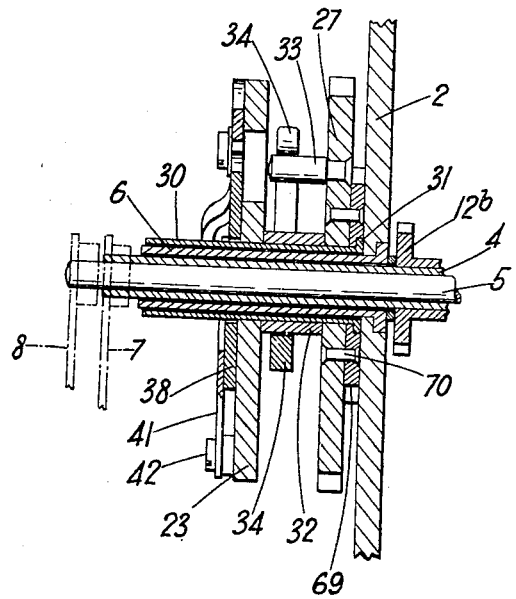
Figure 12 shows a detail view of the hour-hand sleeve and minute-hand spindle with their associated parts.

A sleeve 30, Figure 12, provided with a flange 31 is rotatably mounted on the sleeve 6 and carries rigidly connected to it the 31-tooth ratchet wheel 27, a spacing sleeve 32, the gap disc 23 and also a 31-tooth gear wheel 69 riveted to the ratchet wheel 27 by rivets 70. The ratchet wheel 27 with which co-acts the driving pawl 24 on the rocker 19, is provided with a pin 33 which co-acts with the hook-shaped arm 34 of a bell-crank lever 35, Figure 11, so as to impart a rocking movement to this lever on rotation of the ratchet wheel 27. The lever 35 in its movement actuates a driver pawl 36 for the 48-tooth ratchet wheel 13 rotatably mounted on the date indicator drive spindle 9. The hook-shaped arm 34 partially embraces the sleeve 32 between the 31-tooth ratchet wheel 27 and the gap disc 23.

The gap disc 23 has a permanent gap formed in its periphery and on front of this disc there is rotatably mounted on the sleeve 30 a movable mask 38 having a projection 39, the outer edge 40 of which is adapted to form a continuation of the periphery of the disc. The mask 38 is retained on the sleeve 30 by means of a fork-shaped spring 41 secured to the front of the gap disc 23 by the screwed pin 42, the spring 41 also acting to retain the mask in its set position. The mask 38 is adapted to be moved automatically so that its projection 39 overlaps more or less the permanent gap and vary the effective length of the gap 37 for a purpose to be hereinafter described.

The mask 38 is provided with a notch 43 in which the arm 44 of a three-armed lever 45 engages. The three-armed lever 45 is pivotally mounted on a screwed pin 46 arranged on the front face of the gap disc 23, while the arm 47 of this lever engages with the longer arm 48 of a two-armed lever 49 pivotally mounted on a screwed pin 50 which is also arranged on the front face of the gap disc 23. A spring plate 50a is provided on the pin 50 and is located between the head of this pin and the lever 49 so as to retain the latter in its set position. The arm 51 of the lever 49 is adapted to contact with the smaller periphery of the mask 38 to limit the movement of this lever, and therefore the extent of the gap 37 in one direction. The third arm 52 of the three-armed lever 45 is adapted to be acted on during the rotation of the gap disc 23 in the month of February by the arm 53 of a bell-crank lever 54 pivotally mounted on a pin 55 fixed in the plate 2.

The movement of the lever 54 is limited by stops 56 which co-act with a fixed stop 57 secured to the plate 2, while the arm 58 of this lever co-acts with four fixed pins 59 and 59a spaced apart at intervals on the face of the notched disc 14 rotatably mounted on the date indicator drive spindle 9. A detent 60 is pivotally mounted on a screwed pin 61 arranged on the plate 2 and is provided with a spring 62 which is attached to the plate 2 by the screw 62a and which holds the detent in contact with the teeth of the 31-tooth ratchet wheel 27, above described, so as to prevent backward movement of the same. The sleeve 30 together with the parts attached to it are retained in position on the sleeve 6 by means of a retaining member 63 which is attached to the plate 2 by a screw 64.

Figure 9:
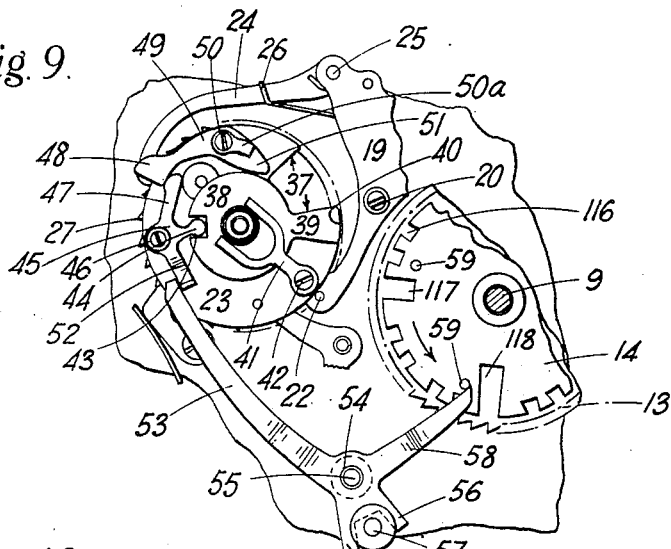
Figures 9 and 10 show detail views of the mechanism for automatically increasing and decreasing the gap in the gap disc.
Figure 10:
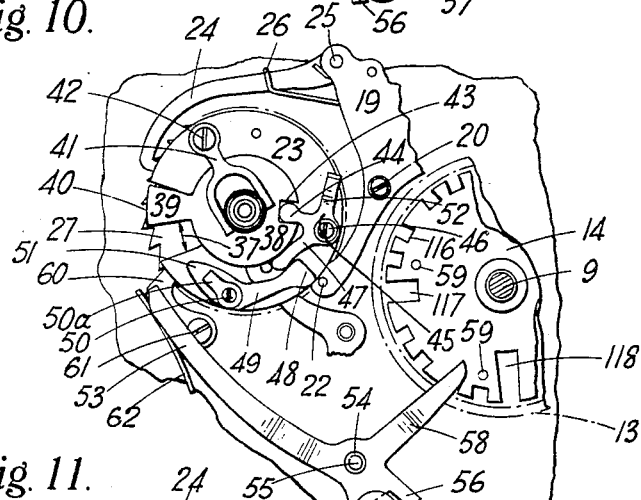

The bell-crank lever 35, Figures 5, 9 and 10, above described, is pivotally mounted on a pin 65 fixed to the plate 2, and the driver pawl 36 for the 48-tooth ratchet wheel 13 is pivotally mounted on the arm 66 of this lever by means of the pin 67. The driver pawl 36 is provided with a spring 68 connected to the pawl and the arm 66, and this spring maintains the pawl in contact with the teeth of the ratchet wheel 13.

The toothed wheel 69, Figures 5 and 12, attached to the rear face of the 31-tooth ratchet wheel 27, has 31 teeth. This toothed wheel 69 actuates through an intermediate wheel 71 a toothed wheel 72, Figures 5, 5a, 5b, 5c and also having 31 teeth which is secured to a spindle 73 rotatably mounted at one end in the plate 2 and at its other end in a bracket 74 secured by means of screws 75 to the plate 2. The toothed wheel 71 is rotatably mounted on a screw 71a screwed into the plate 2. The spindle 73 has also secured to it a snail 76 having a curved slot 77 concentric with the axis of the snail and extending through an angle of about 90 degrees. On the spindle 73 and between the 31-tooth wheel 72 and the snail 76 is loosely mounted the sleeve 78a to which a wheel 78 having a single tooth 79 is fixed, and to the wheel 78 is riveted a pin 80 which projects into the curved slot 77 in the snail 76. On the plate 2 a striking lever 81 is pivoted on a pin 82 fixed to this plate, and is provided with a pin 83 at an intermediate point in its length. The intermediate pin 83 contacts with the periphery of the snail 76 against which it is pressed by means of a torsion spring 84 acting on the striking lever 81. When the pin 83 on the striking lever 81 is tripped by the snail 76, the spring 84 acting on this lever causes its free end to strike the pin 80 on the one-tooth wheel 79 which is thereby quickly engaged with and disengaged from a 24-tooth wheel 85 rotatably mounted on a pin 86 fixed in the plate 2. During the period of its engagement the one-tooth wheel 79 rotates the 24-tooth wheel 85 through the distance of two teeth and at the end of this movement locks it in position.

On the front of the 24-tooth wheel 85 is fixed a second wheel 87 having 12 teeth of square form with which engages a blade spring 88 attached at one end to the plate 2 by means of a screw 89. The spring 88 prevents backlash of the wheels 85 and 87. On the front of the 12-tooth wheel 87 a flanged sleeve 90 is rotatably mounted on the pin 86 carrying this wheel and is retained on this pin by a screw 91. The sleeve 90 is secured to the wheel 87 by means of its lug 90a and a screw 92. To the flange 90b of the sleeve 90 a dial 93 is secured by means of two screws 93a and a washer 93b, the screws 93a being screwed into the holes 95. The dial 93 is divided into twelve equal parts and in these parts the months of the year are indicated in sequence. The dial 93 registers with an aperture 96, Figure 1, in the face 97 of the clock, and in this aperture the month is displayed.

To the back of the 24-tooth wheel 85 a toothed wheel 98 having eighteen teeth is fixed and meshes with a wheel 99 having seventy-two teeth rotatably mounted on a screwed pin 100 arranged on the plate 2. The wheel 99 thus makes one revolution to every four revolutions of the wheel 85 or, in other words, makes one revolution every four years. On the back of the 72-tooth wheel an annular strip 101, Figure 4, is divided into four equal parts. This strip is painted white and the four divisions are provided with the numbers 1 to 4. On the back of the plate 2 is arranged a window 101a extending through an angle of 90 degrees through which these numbers may be viewed. The purpose of these numbers will be hereinafter explained.

Figure 15:
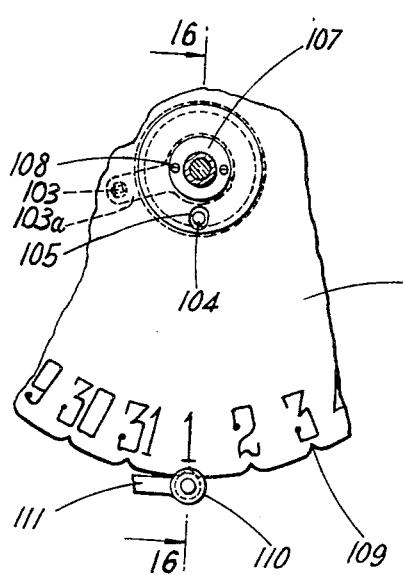
Figure 15 shows a detail view of the mounting of the days of the month dial.
Figure 16:
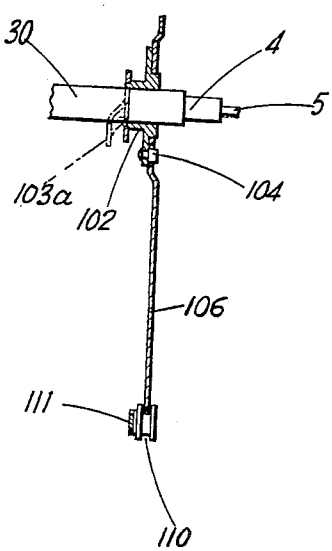
Figure 16 shows a section through the line 16—16 on Figure 15.

On the front end of the sleeve 30 a flanged sleeve 102 is mounted, Figures 3, 15 and 16, and is attached to the gap disc 23 by means of a screw 103 which passes through a lug 103a (Figure 15) formed on the flanged sleeve and engages with a screwed hole 103b, Figure 5, in the gap disc. On the flanged sleeve 102 a pin 104 is fixed and this pin engages somewhat loosely with a hole 105 on the days of the month dial 106. The dial 106 is retained on the flanged sleeve 102 by means of a washer 107 and screws 108, and is positively driven by the gap disc 23. The dial is divided into 31 equal parts and in these divisions the numbers 1 to 31 are arranged in sequence and represent the days of the month. The edge of the dial 106 is provided with notches 109 and with these notches a roller 110 mounted on a lever 111 co-acts. The lever 111 is pivotally mounted on a pin 112 fixed to the plate 2. The roller 110 is held in contact with the edge of the dial 106 by means of a spring 113 connected at one end to the lever 111 and at the other end to a pin 114 fixed in the plate 2. The lever 111 in conjunction with the notches 109 and the slight play of the pin 104 in the hole 105 ensures that the numbers on the dial 106 correctly register with the aperture 115, Figure 1. The aperture 115 is equal in size to one of the divisions of the dial 106 and through this aperture the day of the month is displayed.

The snail 15 on the date indicator mechanism drive spindle 9 is arranged so that the rocker 19 is tripped every night about midnight, and the maximum lift of the snail is such as to move the driving pawl 24 of the rocker over four teeth of the 31-tooth ratchet wheel 27. The face 15a of the snail 15 is curved so as to permit the tripping of the rocker 19 to take place gradually.

The extent of the gap 37 in the gap disc 23 for a month of 31 or 30 days is 2/31, for a month of 29 days 3/31 and for a month of 28 days 4/31 of the circumference of the gap disc.

The periphery of the notched disc 14 has notches of different depths for months of 30, 29 and 28 days. The notches in the disc 14 in conjunction with the gap 37 on the gap disc 23 causes the rocker 19 to be differentially actuated and the number of teeth through which the ratchet wheel 27 is rotated by the driving pawl 24 to be varied according to the number of days in the month. The normal movement of the 31-tooth ratchet wheel 27 about midnight on each day is the distance of one tooth. On the last day of a month with 31 days this movement is also through one tooth, on the last day of a 30-day month the movement is through two teeth, on the last day of a 29-day month the movement is through three teeth, and on the last day of a 28-day month the movement is through four teeth. The periphery of the notched disc 14 is formed with notches to correspond to the above movement extending over a period of four years, i. e., three normal years and one leap year. There is no notch for 31-day months. The notches 116 are those for 30-day months, the notch 117 is for a 29-day month and is twice as deep as the notches for 30-day months while the notches 118, 118a and 118b for 28-day month are three times as deep as those for 30-day months.

The operation of the date indicator mechanism above described is as follows:

Let it be assumed that the time is about 3 a. m. on the 1st of November of a year which is not followed by a leap year. The months dial 93 shows "Nov." in the aperture 96 for displaying the month, in the clock face 97, and the days of the month dial 106 shows "1" in its aperture 115 in the clock face. The sensing pin 22 on the rocker 19 is positioned opposite to the gap 37 on the periphery of the gap disc 23, and the gap is at its minimum, viz., 2/31 of the circumference of the gap disc. The position of the mechanism is shown in Figure 5. The rear end of the pin 19a on the rocker 19 is in contact with the outer face of the tooth 119 on the notched disc 14 so that the sensing pin 22 cannot enter the gap 37. The snail 15 on the indicator mechanism drive spindle 9 rotates in the clockwise direction, and the date indicator mechanism otherwise is at rest. The snail 15 as it rotates makes contact in due course with the roller 21 of the rocker pin 19a and thereafter causes the roller to be raised and the rocker 19 to swing in the anti-clockwise direction round its pin 20 and against the action of its spring 28. During this movement of the rocker 19 the rear end of its pin 19a is moved away from the periphery of the notched disc 14, the sensing pin 22 is swung away from the periphery of the gap disc 23, and the driving pawl 24 for the 31-tooth ratchet wheel 27 connected to the gap disc 23 is gradually moved forward and engages with the next tooth on this wheel. As the snail 15 trips the rocker 19 about midnight on the 1st of November, the rocker gradually swings in the clockwise direction round its pin 20 under the action of its spring 28 and moves the 31-tooth ratchet wheel 27 through one tooth in the clockwise direction, further movement in this direction being prevented by the sensing pin 22 which now contacts with the periphery of the gap disc 23 at a point slightly to the rear of the trailing edge of the gap 37 as the gap disc 23 has also been moved along with the 31-tooth ratchet wheel 27, and also by the pin 19a on the rocker 19 contacting with the tooth 119. The days of the month dial 106 which is connected to the gap disc 23 has also been rotated through one division in the clockwise direction so that in the aperture 115 the number "2" replaces the number "1". The snail 76 co-acting with the one-tooth wheel 79 is also rotated through 1/31 of a revolution by the train of gearing 69, 71 and 72 interconnecting it with the 31-tooth ratchet wheel. The above operations are repeated on each succeeding day of the month, the days of the month being displayed in succession in the aperture 115 in the clockface 97.

During the period from about the 11th to the 26th of the month the pin 33, Figures 11 and 12, attached to the 31-tooth ratchet wheel 27 contacts with the shank of the hook-shaped arm 34 of the bell-crank lever 35, and swings this lever in an anti-clockwise direction. The driver pawl 36 connected to the bell-crank lever 35 by the pin 67 is thus moved toward the right in Figure 11 and rotates the ratchet wheel 13 through the distance of one tooth. As the pin 33 continues its movement, it moves away from the shank of the hook-shaped arm 34 and after an interval contacts with the hook of this arm near the point thereof and swings the bell-crank lever 35 in a clockwise direction, so that the driver pawl 36 is moved toward the left in Figure 11, and as its spring 68 holds it in contact with the ratchet wheel 13 during its movement, it engages with the next tooth thereon. This movement of the 48-tooth ratchet wheel 13 moves the notched disc 14 through 1/48 of a revolution in the anti-clockwise direction and brings the notch 116a, Figure 6, opposite to the rear end of the rocker pin 19a. The pin 19a, however, cannot yet enter the notch 116a as it is prevented from doing so by the contact of the sensing pin 22 with the periphery of the gap disc 23.

Figure 6:
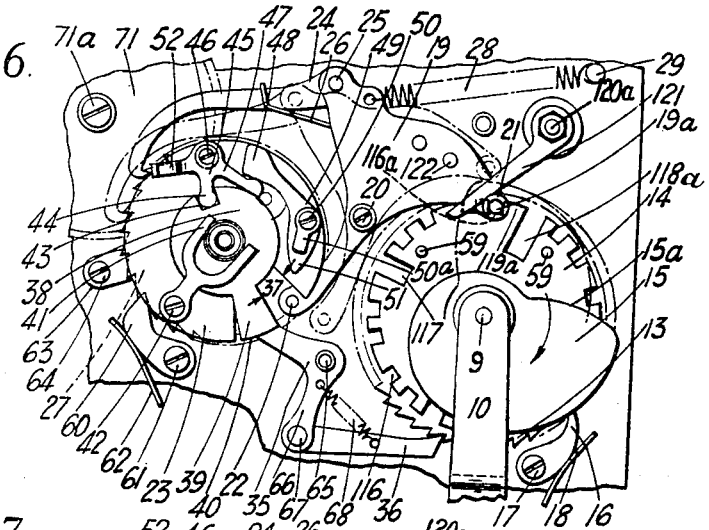
Figure 6 shows a detail view of part of the date indicator mechanism on the completion of a month of thirty days.

This position of the mechanism is shown in Figure 6. With the above movement of the 31-tooth ratchet wheel 27, the wheels 69, 71 move the wheel 72 through a distance of two teeth and the snail 76 trips the striking lever 81 which on its release strikes the pin 80 on the one-tooth wheel 79. The one-tooth wheel 79 thereby rotates the 24-tooth wheel 85 co-acting with it through two teeth and moves the months dial 93 through one division so that "Dec" is displayed in the aperture 96 in the clock face 97. During the above movement of the 31-tooth ratchet wheel 27 the days of the month dial 106 is also moved through two divisions and now displays "1" in the aperture 115 in the clock face 97.

On the 1st of December the snail 15 engages earlier than normally with the rocker pin 19a of the rocker 19 since this pin is located in the notch 116a of the notched disc 14 so that when the rocker is swung in the anti-clockwise direction the driving pawl 24 is moved forward over two teeth on the 31-tooth ratchet wheel 27, while the sensing pin 22 being in the fixed relation with the rocker 19 is moved out of the gap 37 of the gap disc 23 before the rocker is tripped. After the rocker is tripped, however, the driving pawl 24, which is mounted on the rocker, only moves the ratchet wheel 27 through one tooth as the gap disc 37 has rotated to such an extent along with the ratchet wheel 27 that the sensing pin 22 in its clockwise movement along with the rocker, contacts with the periphery of the gap disc 23 adjacent to the trailing edge of the gap 37 and thus prevents further movement of the rocker 19 in the clockwise direction and also prevents the rocker pin 19a from entering the notch 116a.

Stated in other words, the sensing pin 22 lies somewhat outside the periphery of the gap disc 23 and opposite the gap therein at the end of the anti-clockwise movement of the rocker 19, so that during the first part of the clockwise movement, after the rocker has been tripped and while the ratchet wheel 27 is being moved through the distance of one tooth, the pin 22 moves to a position wherein it is tangent to the periphery of the disc 23; but as this disc has been rotated through a small arc along with the ratchet wheel 27, the gap 37 has been moved past the pin 22, and hence the pin 22 engages with the periphery of the gap disc 23 preventing further clockwise movement of the rocker 19 and hence preventing further rotation of the ratchet wheel 27. The dial 106 is thereby moved through one division and now displays "2" in its aperture 115 in the clockface 97, and the snail 76 is simultaneously moved through 1/31 of a revolution by the gear trains 69, 71 and 72.

The operations above described in which the 31-tooth ratchet wheel 27 is moved through one tooth about midnight of each day, the dial 106 moved through one division and the snail 76 through 1/31 of a revolution are repeated during the month of December, and the driver pawl 36 for the 48-tooth ratchet wheel 13 is operated during the month as before and rotates the wheel 13 through the distance of one tooth. This brings the double tooth 119a, Figure 6 opposite to the rear end of the rocker pin 19a. For the greater part of the 30th of December the sensing pin 22 is in the same position on the gap disc 23 as on the 30th of November, viz., on the projection 39 of the mask 38 at a point adjacent to the leading edge of the gap 37. As the night approaches the snail 15 contacts with the rocker pin 19a of the rocker 19 and swings the latter together with the sensing pin 22 in the anti-clockwise direction so that the pawl 24 engages with the next tooth on the 31-tooth ratchet wheel 27. About midnight on the 30th as the snail 15 on the date indicator mechanism drive spindle 9 trips the rocker 19, the 31-tooth ratchet wheel 27 is rotated through one tooth as the sensing pin 22 although opposite to the gap 37 cannot enter the gap owing to the rear end of the rocker pin 19a contacting with the double width tooth 119a on the notched disc 14. The dial 106 is also moved through one division so that "31" is displayed in the aperture 115 in the clock face 97 and the snail 76 is rotated through 1/31 of a revolution in the manner hereinbefore described.

About midnight on the 31st of December the 31-tooth ratchet wheel 27 and the gap disc 23 are again rotated through the distance of one tooth as the snail 15 trips the rocker 19 bringing the gap 37 in the gap disc 23 opposite to the sensing pin 22 which moves into the position illustrated in Figure 5, in which it is opposite to the gap 37. During this movement the dial 106 has been moved through one division so that "1" is displayed in the aperture 115 in the clockface 97, while the snail 76 co-acting with the one-tooth wheel 79 simultaneously trips its co-acting striking lever 81 so that the dial 93 now displays "Jan" in its aperture 96 in the clock face 97.

As the snail 15 swings the rocker 19 in the anticlockwise direction on the 1st of January, the driving pawl 24 is again moved forward so as to engage with the next tooth on the 31-tooth ratchet wheel 27, and as the rocker 19 is tripped about midnight, this ratchet wheel is rotated through the distance of one tooth and the gap disc 23 along with it. The sensing pin 22 now contacts with the periphery of the gap disc 23 at a point adjacent to the trailing edge of the gap 37. The dial 106 is also rotated through one division and displays "2" in the aperture 115 in the clockface 97, while the snail 76 is simultaneously moved through 1/31 of a revolution by the wheel train 69, 71 and 72.

The same operations take place for the remainder of the month of January as have been described for the month of December, and as both these months have 31 days, a single tooth 119a extending for 1/24 of the circumference of the notched disc 14 is provided for these months. The change from January to February is likewise performed in the same manner as from December to January.

Figure 8:
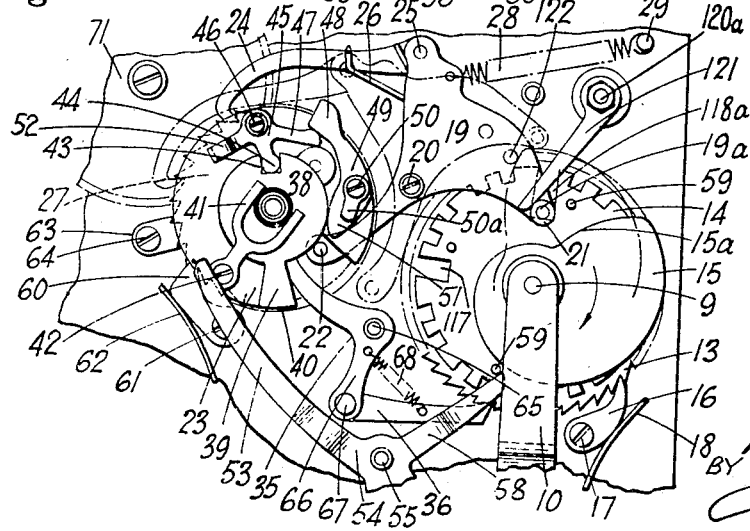

During the month of February, the notch 118a, Figure 8, of the notched disc 14 is brought opposite to the rear end of the rocker pin 19a of the rocker 19 by means of the driver pawl 36 in the manner above described. The notch 118a is three times as deep as the notch for a 30-day month as the year in question is not a leap year. When the notched disc 14 has been moved counterclockwise by the pawl 36 through a space of 1/48 of its circumference from about the 11th to the 18th of this month (February) its pin 59 has at the same time moved the arm 58 in a clockwise direction and caused the arm 53 to be brought into a position where it is in the path of movement of the arm 52 on the three-armed lever 45. Thus when the gap disc 23 is turned clockwise by the pawl 24 from about the 22nd to the 26th of the month, the arm 52 will be engaged and pushed inwardly by the arm 53, thereby causing the mask 39 to be rotated to increase the gap to 4/31 of the circumference of the gap disc. The longer arm 48 of the two-armed lever 49 has also been swung outward by the three-armed lever 45 beyond the periphery of the gap disc 23. With this disposition of the parts, the sensing pin 22 on the 28th of February is located on the projection 39 of the mask 38 close to the leading edge of the gap 37. About midnight on the 28th as the rocker 19 is tripped, the driving pawl 24 gradually moves the ratchet wheel 27 due to the drop on the snail 15 so that when the ratchet wheel 27 has been moved through the distance of one tooth by the driving pawl, the gap 37 of the gap disc 23 is opposite to the sensing pin 22, whereby on further movement of the snail 15 the sensing pin 22 is allowed to move into the gap 37 and hence the driving pawl 24 is allowed to move the ratchet wheel 27 through three additional teeth due to the fact that the rocker pin 19a has moved into the notch 118a which is three times as deep as the notches 116. This position of the parts is shown in Figure 8. The dial 106 is simultaneously moved through four divisions, i. e., from "28" to "1" so as to display the latter number in the aperture 115 and the snail 76 moves through 4/31 of its circumference and trips the lever 81 so that the one-tooth wheel 79 moves the dial 93 so as to display "Mar." in the aperture 96. On the movement of the rocker 19 in the anti-clockwise direction by the snail 15 on the 1st of March, the driving pawl 24 moves forward over four teeth on the 31-tooth ratchet wheel 27 while simultaneously therewith the sensing pin 22, as it is in fixed relation with the rocker 19, is swung out of the gap 37 before the rocker 19 is tripped, but after being tripped this wheel only moves through the distance of one tooth in the clockwise direction since the gap disc 23 moves along with the ratchet wheel 27 and at the end of the movement the sensing pin 22 now contacts with the periphery of the gap disc 23 adjacent to the trailing edge of the gap 37. The dial 106 now shows "2" in the aperture 115 in the clock face 97, and the snail 76 moves through 1/31 of its circumference simultaneously with the above movement of the ratchet wheel 27, in the manner above described.

From the 2nd to the end of March the same operations take place as were described above for December and January but with this additional operation that the sensing pin 22, Figure 10, contacts with the projecting arm 48 of the two-armed lever 49 mounted on the gap disc 23 during the period from about the 8th to the 12th of the month, and swings the lever 49 together with the three-armed lever 45 so as to close the gap 37 to 2/31 of the circumference of the gap disc. The bell-crank lever 54 which co-acts with the pin 59 on the notched disc 14 is returned by gravity to its original position on the next movement of the notched disc 14.

Figure 7:
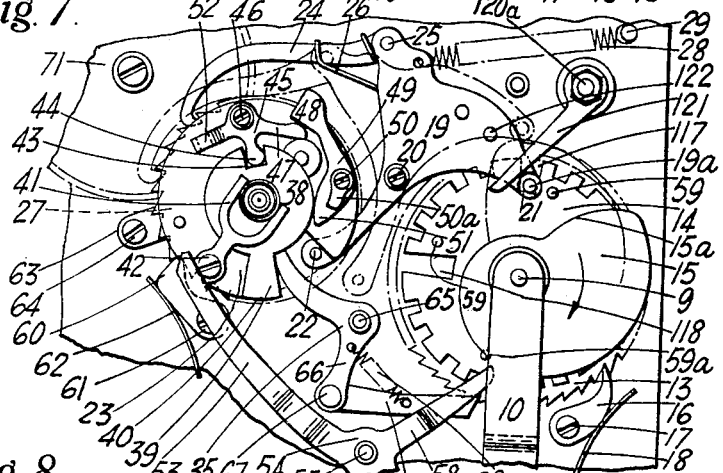
Figures 7 and 8 show similar views on the completion of a month of twenty-nine days and twenty-eight days respectively.

If it is leap year the operations for the month of February are similar to those just described, with the exception that the gap 37 is only increased to 3/31, as shown in Figure 7, of the circumference of the gap disc 23, and on the 29th of February the sensing pin 22 is on the projection 39 of the mask 38 close to the leading edge of the gap 37. The notch 117 which is operative in this case permits a movement of the 31-tooth ratchet wheel 27 through three teeth after the snail 15 has tripped the rocker 19 about midnight on the 29th of February. The position of the parts after the rocker 19 has been tripped on the 29th of February is shown in Figure 7, in which position the dial 106 would show "1" in its aperture 115 in the clock face 97 and the dial 93 would show "Mar." in its aperture 96 in the clock face. When the rocker 19 is moved in the anti-clockwise direction by the snail 15 on the 1st of March, the rocker moves forward over three teeth of the 31-tooth ratchet wheel 27 and simultaneously therewith the sensing pin 22, as it is in fixed relation to the rocker 19, is swung out of the gap 37 of the gap disc 23. After the rocker 19 is tripped about midnight on the 1st of March it only moves the wheel 27 through one tooth as the gap disc 23 moves along with the ratchet wheel 27 so that the sensing pin 22 on the clockwise movement of the rocker 19 contacts with the periphery of the gap disc 23 at a point adjacent to the trailing edge of the gap 37 and thus prevents the rear end of the rocker pin 19a from entering into the slot 117. The width of the gap for the leap year month of February is adjusted to 3/31 of the circumference of the gap disc 23 by suitably locating the pin 59a on the notched disc 14 at a greater distance from the circumference of this disc than the pins 59 to give the necessary lesser movement of the arm 58.

As the remaining months of the year are of 30 or 31 days the operations of the date indicator mechanism are similar to those hereinbefore described for months having the same number of days.

The purpose for choosing the minimum gap 37 in the gap disc 38 as equal to 2/31 of the circumference of the gap disc rather than 1/31 thereof is as follows: As the pin 22 moves into the gap 37 in those months where the pin 19a is opposite to a notch 116 in the notched disc 14, the driving pawl 24 at the same time turns the ratchet wheel 27 and gap disc 38 through the space of 1/31 of the circumference of the gap disc, and therefore an extra space of 1/31 must be left in the gap for the pin 22 to move into.

It will be seen that with the above mechanism a perpetual date indicator is provided which functions without adjustment being necessary for leap years.

In order to set the date indicator mechanism before starting the clock, the dial 101 in the window 101a at the rear of the plate 2 is utilized, Figures 2 and 4. The number "4" on this dial corresponds to a leap year. If the clock is to be started in the year before a leap year, the date indicator mechanism is hand-operated by means of a key, not shown, which is inserted in the hole 120 in the spindle 120a and which by rocking to and fro operates the rocker 19 by means of the arm 121, the arm 121 being connected to the spindle 120a. The arm 121 co-acts with the pin 122 on the rocker 19. This mechanism is operated until the number "3" appears in the window 101a and then continued until the correct date appears in the apertures 96 and 115 in the clock face 97. During this setting operation care should be taken that the snail 15 is not in contact with the roller 21 on the rocker pin 19a, as the date indicator mechanism drive spindle 9 and the snail 15 co-acting therewith are not used in the setting operation. After the correct date is displayed in the apertures 96 and 115, it is only necessary to set the clock hands at the correct time and then to start the clock.

Figure 17:
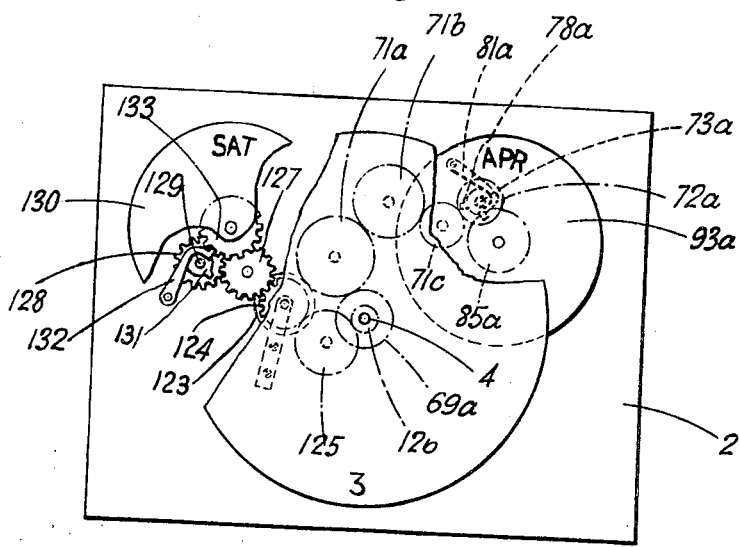
Fig. 17 is a front elevational view in more or less diagrammatic form of a modification of the invention and illustrating an arrangement of date indicator mechanism for indicating the day of the week, the day of the month and the month.

In some cases a dial for displaying the days of the week may be included in the date indicator mechanism, and an arrangement of this kind is shown diagrammatically in Figure 17. In this arrangement the months dial 93a is operated from the 31-tooth wheel 69a through the intermediate toothed wheels 71a, 71b, 71c, a 31-tooth wheel 72a, a spindle 73a and a trip mechanism consisting of a snail, not shown, a striking lever 81a, a one-tooth wheel 78a and a 24-tooth wheel 85a, in a similar manner to that hereinbefore described with reference to the dial 93.

The arrangement for displaying the days of the week is as follows:

In the plate 2 a hole 123 is formed and through this hole a broad toothed-wheel 124 extends. Behind the plate 2 the toothed wheel 124 engages with a toothed wheel 125 which in turn engages with a toothed wheel 126 fixed to the hour-hand sleeve 4. In front of the plate 2 the toothed wheel 124 engages with a toothed wheel 127 which engages with a toothed wheel 128 rigidly attached to the spindle 129. The gear ratio of the wheel train is so arranged that the toothed wheel 126 makes two revolutions for one revolution of the toothed wheel 128. The dial 130 showing the days of the week is actuated from the toothed wheel 128 through a one-tooth wheel 131, which is loosely mounted on the spindle 129 and which is actuated by the lever 132 on the latter being tripped by a snail, not illustrated, and through a toothed wheel 133 rigidly attached to the dial 130 in a similar manner to that hereinbefore described in connection with the dial 93, the dial 130 having one set of the days of the week thereon. The remainder of the mechanism is similar to that previously described. The day of the week, the day of the month, and the month are displayed in appropriate apertures in the face plate of the clock.

In Figures 18 and 19 I have illustrated more or less diagrammatically an arrangement of date indicator mechanism in which the days of the month are displayed on the rims of numeral wheels. In this case the snail 15 has a maximum lift which causes the rocker 19 to move through a distance corresponding to five teeth of the ratchet wheel 27. Further the rocker 19 is provided with two driving pawls 24 and 24a, the pawl 24 co-acting with the ratchet wheel 27, while the pawl 24a co-acts with the ratchet wheel 27a rigidly attached to the ratchet wheel 27. The diameter of the wheel 27a is equal to that of the wheel 27. The ratchet wheel 27 in this case has thirty-three teeth, while the ratchet wheel 27a has only two teeth and these teeth are arranged at an angle of 120 degrees in relation to each other. The driving pawl 24 is provided with an extension 140 which co-acts in the manner hereinafter described with a pin 141 fixed on the side plate 2. The arrangement of the parts is such that normally the snail 15 swings the rocker 19 in the anti-clockwise direction so that the pawl 24 moves over two teeth of the wheel 27.

The function of the driving pawl 24a and the wheel 27a will be hereinafter described.

The ratchet wheels 27 and 27a together with the gap disc 23 are rigidly mounted on a sleeve 142 which is rotatably mounted on the spindle 143. The spindle 143 passes through a hole in the plate 2 and is rigidly mounted in a bracket 144 arranged on the rear side of the side plate 2, and attached to this plate by means of the screw 145. On the sleeve 142 a toothed wheel 146 is rigidly mounted and engages with a pinion 147 rigidly mounted on a spindle 148 rotatably mounted in the side plates 2 and 2a. The ratio of the gear wheels 146, 147 is 3 to 1. On the spindle 148 a flanged sleeve 149 is rigidly mounted and this sleeve is attached to a disc 150 by means of screws 151. The disc 150 has three pairs of axially projecting teeth, 152, 153 and 154 with a recess 155 formed between the teeth of each pair. The units numeral wheel 156 has a series of numerals fully described later in the specification, in which series there are two successive numerals 1. The units numeral wheel 156 is rigidly attached to the disc 150. The teeth 152 are located between the second numeral "1" and the numeral "2," the teeth 153 between the numerals "3" and "4," and the teeth 154 between the numerals "5" and "6" of the units numeral wheel 156. A toothed wheel 157 is attached to a flanged sleeve 158 by means of screws 159, the flanged sleeve being rotatably mounted on the spindle 148. The toothed wheel 157 has thirty-six teeth and the tens numeral wheel 160 is rigidly attached to this wheel.

A transfer shaft 161 is rotatably mounted in the side plates 2 and 2a, and on this shaft an 8-tooth wheel 162 is rigidly mounted. The wheel 162 engages with the pairs of teeth 152, 153 and 154 in succession as the disc 150 together with the units numeral wheel 156 is rotated. Adjacent to the wheel 162 a second toothed wheel 163 is rigidly mounted on the transfer spindle 161, and the latter wheel has only four teeth having twice the pitch of the teeth on the wheel 162. The teeth on the wheel 163 are in alignment with corresponding teeth on the wheel 162. The wheels 162 and 163 are equivalent to a mutilated toothed wheel having its alternate teeth cut away for half of their length.

A third toothed wheel 164 having sixteen teeth is rigidly mounted on the transfer spindle 161 and engages with the 36-tooth wheel 157.

The periphery of the units numeral wheel 156 is divided into eleven equal divisions and in these divisions the numerals 0, 1, 1, 2, 3, 4, 5, 6, 7, 8 and 9 are arranged in sequence. The periphery of the tens numeral wheel 160 is divided into nine divisions, two of these divisions being blank, and with the numerals 1, 2 and 3 in the remaining divisions arranged in the following sequence, viz., 1, 1, 1, 2, 2, 2, 3, blank, blank.

When one of the pairs of teeth 152, 153, or 154 engages with and is disengaged from the wheel 162 the latter is rotated through ¼ of one revolution, and is locked in position by the points of two adjacent teeth on the wheel 163 engaging with the periphery of the disc 150. During the above movement the tens numeral wheel 160 is rotated through ⅑ of one revolution or through one division by way of the spindle 161, wheel 164 and wheel 157. The teeth 153 cause a change of the tens numeral wheel 160 from the first "1" to the second "1" or from the first "2" to the second "2" or from the "3" to the first "blank," the teeth 154 cause a change of the wheel 160 from the second "1" to the third "1" or from the second "2" to the third "2" or from the first "blank" to the second "blank," and the teeth 152 from the third "1" to the first "2" or from the third "2" to the "3" or from the second "blank" to the first "1" of the wheel 160. Further, when the 33-tooth ratchet wheel 27 is moved through the distance of one tooth by the pawl 24, the units numeral wheel 156 is rotated through 1/11 of one revolution or through one division by way of the sleeve 142, wheels 146 and 147, and shaft 148.

From the numerical sequence of the units numeral wheel 156 it will be evident that on the 10th and 20th or alternatively on the 11th and 21st of each month it will be necessary to rotate the units numeral wheel 156 through two units so as to skip one of the two numerals "1" on this wheel. For this purpose the pawl 24a and the 2-tooth ratchet wheel 27a are provided. In the present example the skipping takes place on the 11th and 21st of each month, but if it is desired that this operation take place on the 10th and 20th, the position of the teeth on the 2-tooth ratchet wheel 27a is altered to correspond. The manner in which one of the numerals 1 is skipped is as follows: The pawl 24 during its forward stroke ordinarily moves through a distance equal to two teeth of the ratchet wheel 27, but due to the engagement of the extension 140 on this pawl with the pin 141, the pawl 24 on its return stroke moves the ratchet wheel 27 only through the distance of one tooth. On the 11th and 21st of each month the pawl 24a engages behind one of the two teeth on the ratchet wheel 27a at the same moment that the pawl 24 is raised out of engagement with the ratchet wheel 27 by the engagement of the extension 140 and pin 141. Then when the succeeding return stroke of the two pawls, 24 and 24a, takes place, the pawl 24a drives the wheel 27a and with it the wheel 27 through the distance of one tooth (while the pawl 24 is maintained out of contact with the wheel 27 owing to the extension 140 thereof riding on the pin 141), after which the pawl 24 drops into contact with the wheel 27 and is pulled along with the pawl 24a as the latter moves the wheels 27 and 27a through the remaining distance of one tooth, making a total distance of two teeth through which the wheel 27 is moved.

The notched disc 14, the mask 38 together with the mechanisms for actuating these parts, and the driving mechanism for the snail are similar to those in the first arrangement described. Further, instead of the time being shown by hands on a dial, it may be shown by displaying appropriate numerals in apertures by any of the known mechanisms for this purpose.

The operation of the arrangement just described is as follows:

It will be understood that the rocker 19 is tripped each day about midnight by the snail 15 in the manner hereinbefore described with reference to the first arrangement, and that the resulting movement of the ratchet wheel 27 is through one tooth except on the 11th and 21st of each month and on the last day of months having a number of days other than thirty-one. The normal movements of the rocker 19 and the pawl 24 are as follows:

The rocker 19 is swung by the snail 15 in the anti-clockwise direction against the action of the spring 23 during the evening as in the first described arrangement, except that in the present case the movement of the rocker 19 is of such extent that the pawl 24 moves over two teeth of the wheel 27. During the latter part of this movement of the pawl 24 its extension 140 moves onto the pin 141 so as to lift the pawl 24 out of contact with the wheel 27. When the snail 15 trips the rocker 19 about midnight as in the arrangement first described, the rocker 19 is swung in the clockwise direction by the spring 23 and during the first part of this movement, as the extension 140 of the pawl 24 rests on the pin 141, the pawl 24 is prevented from engaging with the last of the two teeth over which it passed in the preceding anti-clockwise movement of the rocker 19; and when the extension 140 has moved off the pin 141 in the latter part of the clockwise movement of the rocker 19, the pawl 24 engages with the tooth of the wheel 27 next to that with which it previously engaged and then moves the toothed wheel through the distance of one tooth as determined by the gap disc 23 in exactly the same manner as in the arrangement first described. The movement of the wheel 27 is transmitted as above described to the units numeral wheel 156 which is accordingly moved through one division.

The movements of the rocker 19 and pawl 24 at the end of a month having 31 days is as above described for their normal movements, the extent of the clockwise movement of the rocker 19 on the 30th and 31st of the month in this case being determined by the notched disc 14 as in the first described arrangement.

In the case of a month having 30 days the movements of the rocker and the pawl 24 on the last night of the month are similar to their normal daily movements above described except that after being tripped by the snail about midnight the movement of the rocker 19 in the clockwise direction causes the pawl 24 to rotate the wheel 27 through two teeth in the same manner as in the first described arrangement and consequently to move the units wheel 156 through two divisions. On the night of the first day of the next month the snail 15 moves the rocker 19 in the anti-clockwise direction so that the pawl 24 slides over three teeth of the wheel 27 and on the succeeding movement of the rocker 19 in the clockwise direction the pawl 24 engages with the second tooth in advance of that with which it previously engaged and moves the wheel 27 through one tooth and the units numeral wheel 156 through one division.

In months having 29 or 28 days the movements of the rocker 19 and pawl 24 on the night of the last day of the month are similar to their normal movements with this difference that the clockwise movement of the rocker 19 is of such extent as to cause the pawl 24 to move the wheel 27 through three or four teeth respectively as in the first described arrangement, and consequently to rotate the units numeral wheel 156 through three or four divisions. On the night of the first day of the following month the snail 15 moves the rocker 19 in the anti-clockwise direction so that the pawl 24 moves over four or five teeth according as the month has 29 or 28 days, and to engage either with the third or fourth tooth of the wheel 27 in advance of the tooth with which it previously engaged and on the succeeding clockwise movement of the rocker 19 the pawl 24 moves the wheel 27 through the distance of one tooth, and the units numeral wheel 156 through one division.

On the first day of a month having thirty-one days the first of the two blanks on the tens numeral wheel 160 and the second of the two numerals "1" on the units numeral wheel 156 are displayed in the aperture 165. About midnight on this day the units numeral wheel 156 is moved through the one division as above described so that the numeral "2" is displayed in the aperture 165. When the units numeral wheel 156 moves from the above position and brings the numeral "3" opposite to the aperture 165, the pair of teeth 154 simultaneously moves the tens numeral wheel 160 through one division as above described so that the second of the two blanks on the tens numeral wheel is brought opposite to the aperture 165. From the 3rd to the 9th of the month the units numeral wheel 156 is moved through one division on each day and brings the numerals "4", "5", "6", "7", "8", and "9" in succession opposite to the aperture 165. On the 9th of the month as the units numeral wheel 156 is moved through one division to bring the numeral "0" opposite to the aperture 165, the tens numeral wheel 160 is simultaneously moved through one division by means of the pair of teeth 152 and brings the first of its three numerals "1" opposite to the aperture 165 which thus shows "10".

On the 10th of the month the units numeral wheel 156 is moved through one division so that in the aperture 165 the number "11" is displayed, while on the 11th of the month the pawl 24a engages with the corresponding tooth on the ratchet wheel 27a and moves the units numeral wheel 156 through two divisions so that the second of its numerals "1" is skipped and the numeral "2" is brought opposite to the aperture 165. Simultaneously with this movement of the units numeral wheel 156 the pair of teeth 153 moves the tens numeral wheel 160 through one division and the second of its three numerals "1" is brought opposite to the aperture 165 which then displays "12". When the units numeral wheel 156 moves to bring the numeral "3" opposite to the aperture 165 the tens numeral wheel 160 is rotated through the action of the teeth 154 through one division so as to bring the third of its three numerals "1" opposite to the aperture 165 which then displays "13".

The changes from the 13th to the 19th of the month take place similarly to the changes from the 3rd to the 9th, the units numeral wheel 156 being moved to bring its numerals "4", "5", "6", "7", "8", and "9" opposite to the aperture 165 on successive days of the month, while the tens numeral wheel 160 remains with the third of its three numerals "1" opposite to this aperture. The change from the 19th to the 20th is made in a similar manner to that from the 9th to the 10th, the units numeral wheel 156 moving through one division to bring its numeral "0" and the tens numeral wheel 160 moving through one division to bring the first of its three numerals "2" opposite to the aperture 165 which then shows "20". The changes from the 20th to the 30th of the month are made similarly to those from the 10th to the 20th, the movement of the units numeral wheel 156 on the 21st being through two divisions as on the 11th so that the second of its two numerals "1" is skipped and simultaneously therewith the tens numeral wheel 160 is moved by the pair of teeth 153 to bring the second of its three numerals "2" opposite to the aperture 165, while on the next movement of the units numeral wheel 156 the third of the three numerals "2" on the tens numeral wheel 160 is brought opposite to the aperture 165 by means of the pair of teeth 154. On the change from the 29th to the 30th the tens numeral wheel 160 is rotated by the pair of teeth 152 to bring its numeral "3" opposite to the aperture 165.

The change from the 30th to the 31st of the month is effected by the movement of the units numeral wheel through one division, and on the succeeding movement of this wheel the second of its two numerals "1" is brought opposite to the aperture 165, while simultaneously therewith the first of the two blanks on the tens numeral wheel is also brought opposite to this aperture by the pair of teeth 153.

For months of 30, 29 and 28 days the operations during the month is similar to that above described for the 31-day month, with the exception that on the last day of a 30-day month the units numeral wheel 156 is rotated through two divisions by the pawl 24, while the tens numeral wheel 160 is rotated through one division by the pair of teeth 153. The units numeral wheel therefore skips the first of the numerals "1" thereon, while the tens numeral wheel 160 moves from "3" to the first blank thereon.

On the last day of a 29-day month the units numeral wheel 156 is rotated through three divisions by the pawl 24, while the tens numeral wheel 160 is moved through two divisions by the engagement of the pairs of teeth 152 and 153 with the toothed wheel 162. The units numeral wheel 156 in this case skips the numeral "0" and the first of the two numerals "1" thereon, while the tens numeral wheel 160 skips the numeral "3".

On the last day of a 28-day month the units numeral wheel 156 is rotated through four divisions by the pawl 24, while the tens numeral wheel 160 is rotated through two divisions by the engagement of the two pairs of teeth 152 and 153 with the toothed wheel 162. The units numeral wheel 156 thus skips the numerals "9", "0" and the first of the two numerals "1" thereon, while the tens numeral wheel skips the numeral "3".

By means of my invention an efficient form of date indicator mechanism suitable for use in conjunction with clocks is provided which is capable of operation without attention for practically an unlimited number of years, and automatically adjusts itself for leap years.

Although the invention has been described by way of example as applied to an electrically driven clock, its use is not limited to this application, as it may be applied to clocks actuated by spring or other form of power, and may be used as a date indicator without time indication. It may also be applied to hand-operated date indicators.

Further it may be adapted to other arrangements of the calendar than that above described.

Modifications may be made in detail and arrangement of the examples of my invention above described.

I claim:

1. In an indicator the combination of a display member; a toothed wheel attached to said display member; a mutilated wheel meshing with said toothed wheel; a snail having a lost motion connection with said mutilated wheel; a driving member connected to said snail; and a striking lever adapted to be tripped by said snail to operate said mutilated wheel.

2. In an indicator the combination of a display member; a toothed wheel attached to said display member; a one-tooth wheel gearing with said toothed wheel; a snail having a lost-motion connection with said one-tooth wheel; a driving member connected to said snail; and a striking lever adapted to be tripped by said snail to operate said one-tooth wheel.

3. In a date indicator the combination of units and tens numeral wheels for displaying the days of the month; gearing interconnecting said numeral wheels; oscillating means for driving said units numeral wheel; means for controlling the movement of said oscillating means; and means for periodically varying the extent of the movement imparted to said units numeral wheel normally by said oscillating means and with normal movement of said oscillating means.

4. In a date indicator the combination of units and tens numeral wheels for displaying the days of the month; gearing interconnecting said numeral wheels; ratchet wheel means and driving pawl means for driving said units numeral wheel; means for controlling the movement of said ratchet and pawl driving means; and means for periodically increasing the extent of the movement imparted to said ratchet wheel means normally by said driving pawl means and with normal movement of said driving pawl means.

5. In a date indicator the combination of units and tens numeral wheels for displaying the days of the month; two ratchet wheels in fixed relation to each other for driving said displaying means; two driving pawls for said ratchet wheels; a rocker member carrying said driving pawls; means for oscillating said rocker member; means for controlling the amplitude of the oscillations of said rocker member; and means for raising one of said pawls out of engagement with its co-acting ratchet wheel for part of its operative movement while the other pawl is in operative engagement with its ratchet wheel.

6. In a date indicator the combination of units and tens numeral wheels for displaying the days of the month, gearing including mutilated wheels interconnecting said units and tens numeral wheels; ratchet wheel and driving pawl means for actuating said units numeral wheel; means for controlling the movement of said driving pawl means, said controlling means including a gap disc and a notched disc; and means for periodically effecting an increased movement of said ratchet wheel means with normal movement of said driving pawl means.

7. In a date indicator the combination of means for indicating the days of the month; ratchet wheel means in driving connection with said indicating means; a disc having a gap on its periphery, connected to said ratchet wheel means; a mask member for determining the operative extent of said gap, mounted on said gap disc; a disc having notches on its periphery, mounted independently of said ratchet wheel means; oscillating driving means for said ratchet wheel means, said driving means feeling in its normal operative movements the peripheries of said gap disc and said notched disc; means for intermittently rotating said notched disc automatically; together with means for automatically positioning said mask on said gap disc for initiating operating movements of increased amplitude of said driving means at the end of months having less than thirty-one days, the extent of said increased movements being determined by said notched disc.

8. In a date indicator the combination of means for indicating the days of the month; ratchet wheel means in driving connection with said indicating means; a disc having a gap on its periphery connected to said ratchet wheel means; a mask member for determining the operative extent of said gap, mounted on said gap disc; a disc having notches on its periphery, mounted independently of said ratchet wheel means; oscillating driving means for said ratchet wheel means, said driving means feeling in its normal operative movements the peripheries of said gap disc and said notched disc; means for intermittently rotating said notched disc automatically; means for automatically positioning said mask on said gap disc for initiating operative movements of increased amplitude of said driving means at the ends of months having less than thirty-one days, the extent of said increased movements being determined by said notched disc; a gear wheel attached to said ratchet wheel means; means for indicating the names of the months; together with means coacting with said gear wheel for shifting said month indicating means.

9. In a date indicator the combination of means for indicating the days of the month; clock mechanism; ratchet wheel means in driving connection with said indicating means; a disc having a gap on its periphery, connected to said ratchet wheel means; a mask member for determining the operative extent of said gap, mounted on said gap disc; a disc having notches on its periphery, mounted independently of said ratchet wheel means; oscillating driving means for said ratchet wheel means, driven by said clock mechanism and feeling in its normal operative movements the peripheries of said gap disc and said notched disc; means for intermittently rotating said notched disc automatically; means for automatically positioning said mask on said gap disc for initiating operative movements of increased amplitude of said driving member at the end of months having less than thirty-one days, the extent of said increased movements being determined by said notched disc; a gear wheel attached to said ratchet wheel means; means for indicating the names of the months; means coacting with said gear wheel for shifting said months indicator; means for indicating the days of the week; together with means coacting with the hour-hand sleeve of said clock mechanism for shifting the day of the week indicating means.

10. In a date indicator the combination of means for indicating the days of the month; ratchet wheel means in driving connection with said indicating means; a disc having a gap on its periphery, connected to said ratchet wheel means; a mask member mounted on said gap disc for determining the operative extent of said gap; a disc having notches on its periphery, mounted independently of said ratchet wheel means; oscillating driving means for said ratchet wheel means, said driving means feeling in its normal operative movements the peripheries of said gap disc and said notched disc; means coacting with said ratchet wheel means for intermittently rotating said notched disc; means coacting with said notched disc for displacing said mask member from a minimum gap position to positions for initiating operating movements of increased amplitude of said driving means at the end of February in normal and leap years, the extent of said increased movements being determined by said notched disc; together with means coacting with said driving means for returning said mask member to the minimum gap position.

11. In a date indicator the combination of means for indicating the days of the month; ratchet wheel means in driving connection with said indicating means; a disc having a gap on its periphery, connected to said ratchet wheel means; a mask member mounted on said gap disc, for determining the operative extent of said gap; a disc having notches on its periphery mounted independently of said ratchet wheel means; oscillating driving means for said ratchet wheel means, said driving means feeling in its normal operative movements the peripheries of said gap disc and said notched disc; means coacting with said ratchet wheel means for intermittently rotating said notched disc; means coacting with said notched disc for displacing said mask member from a minimum gap position to positions for initiating operative movements of increased amplitude at the end of February in normal and leap years, the extent of said increased movements being determined by said notched disc; means coacting with said driving means for returning said mask member to the minimum gap position; a gear wheel connected to said ratchet wheel; means for displaying the names of the months; together with means coacting with said gear wheel for shifting said months indicating means.

12. In a date indicator the combination of means for indicating the days of the month; clock mechanism; ratchet wheel means in driving connection with said indicating means; a disc having a gap on its periphery, connected to said ratchet wheel means; a mask member mounted on said gap disc for determining the operative extent of said gap; a disc having notches on its periphery, mounted independently of said ratchet wheel means; oscillating driving means for said ratchet wheel means driven by said clock mechanism and feeling in its normal operative movements the peripheries of said gap disc and said notched disc; means coacting with said ratchet wheel means for intermittently rotating said notched disc; means coacting with said notched disc for displacing said mask member from a minimum gap position to positions for initiating operative movements of increased amplitude of said driving means at the end of February in normal and leap years, the extent of said increased movements being determined by said notched disc; means coacting with said driving means for returning said mask member to the minimum gap position; a gear wheel connected to said ratchet wheel means; means for indicating the names of the months; means coacting with said gear wheel for shifting said months indicating means; means for indicating the day of the week; means coacting with the hour-hand sleeve of said clock mechanism for shifting the day of the week indicating means.

13. In a date indicator the combination of means for indicating the days of the month; a disc having a gap on its periphery, connected to said indicating means; a mask member mounted on said gap disc, for determining the operative extent of said gap; a 31-tooth ratchet wheel connected to said gap disc; a driving spindle; a disc having its periphery notched to correspond to the length of months for a period of four years, rotatably mounted on said spindle; a plurality of pins on said notched disc; a ratchet wheel having forty-eight teeth, attached to said notched disc; a rocker having a driving pawl for said 31-tooth ratchet wheel and having feeling members for the peripheries of said gap and notched discs, said rocker being mounted independently of said driving spindle and said 31-tooth ratchet wheel; a snail rigidly mounted on said driving spindle, for moving said driving pawl on said rocker inoperatively over said 31-tooth ratchet wheel; a spring attached to said rocker for performing its operative movements and driving said 31-tooth ratchet wheel, the extent of said operative stroke being determined normally by said gap and notched discs coacting with said feeling members; lever means coacting with said pins on said notched disc, for displacing said mask member from its minimum gap position to positions for February in normal and leap years and initiating operative movements of increased amplitude of said rocker and said driving pawl for said month, the extent of said increased movements being determined by corresponding notches on said notched disc; means coacting with a feeling member on said rocker for returning said mask member to its minimum gap position after displacement therefrom; together with means coacting with said 31-tooth ratchet wheel for moving said 48-tooth ratchet wheel through ⅛ part of its circumference in every revolution of said 31-tooth ratchet wheel.

14. In a date indicator the combination of means for indicating the days of the month; a disc having a gap on its periphery, connected to said indicating means; a mask member mounted on said gap disc, for determining the operative extent of said gap; a three-armed lever on said gap disc, engaging said mask member with one of its arms; a two-armed lever on said gap disc engaging with one of its arms a second arm of said three-armed lever; a 31-tooth ratchet wheel connected to said gap disc; a pin on said ratchet wheel; a driving spindle; a disc having its periphery notched to correspond to the lengths of the months for a period of four years, rotatably mounted on said spindle; a plurality of pins on said notched disc; a ratchet wheel having forty-eight teeth attached to said notched disc; a rocker having a driving pawl for said 31-tooth ratchet wheel and feeling members for said gap and said notched discs, mounted independently of said driving spindle and said 31-tooth ratchet wheel; a snail rigidly mounted on said driving spindle for moving said driving pawl on said rocker inoperatively over teeth on said 31-tooth ratchet wheel; a spring attached to said rocker for performing the operative movements of said rocker and causing said driving pawl thereon to drive said 31-tooth ratchet wheel, the extent of said operative movements being determined normally by said feeling members on said rocker coacting with said gap and notched discs; lever means coacting with said pins on said notched disc and engaging the third arm of said three-armed lever on said gap disc to displace said mask member from its minimum gap position to positions for February in normal and leap years and initiating operative movements of increased amplitude of said rocker and said driving pawl for this month, the extent of said increased movements being determined by corresponding notches on said notched disc, and said mask being returned to its minimum gap position by the engagement of a feeling member on said rocker with the second arm of said two-armed lever on said gap disc; a two-armed lever having a hooked end on one of its arms and a driving pawl on its other arm, said hooked arm coacting with said pin on said 31-tooth ratchet wheel to cause said driving pawl to rotate said 48-tooth ratchet wheel through $\frac{1}{48}$ part of a revolution in every revolution of said 31-tooth ratchet wheel; a gear wheel attached to said 31-tooth ratchet wheel; means for indicating the names of the months; together with it means coacting with said gear wheel for shifting said indicating means for the names of the months.

15. In a date indicator the combination of units and tens numeral wheels for displaying the days of the month; means coacting with said units numeral wheel for driving said tens numeral wheel; ratchet wheel means in driving connection with said units numeral wheel; a disc having a gap on its periphery, connected to said ratchet wheel means; a mask member for determining the operative extent of said gap, mounted on said gap disc; a disc having notches on its periphery mounted independently of said ratchet wheel means; oscillating driving means for said ratchet wheel means, said driving means feeling in its normal operative movements the peripheries of said gap disc and said notched disc; means for intermittently rotating said notched disc automatically; means for automatically positioning said mask on said gap disc, for initiating operative movements of increased amplitude of said driving means at the end of months having less than thirty-one days, the extent of said increased movements being determined by said notched disc; together with means coacting with said oscillating driving means for periodically increasing the movements of said ratchet wheel means during certain months.

16. In a date indicator the combination of units and tens numeral wheels for displaying the days of the month; means coacting with said units numeral wheel for driving said tens numeral wheel; two ratchet wheels for driving said units numeral wheel, said ratchet wheels being in fixed relation to each other and one of said ratchet wheels having thirty-three teeth and the other ratchet wheel having two teeth; a rocker member carrying two driving pawls for said ratchet wheels; a disc having a gap on its periphery, connected to said ratchet wheels; a mask member for determining the operative extent of said gap, mounted on said gap disc; a disc having notches on its periphery, mounted independently of said ratchet wheels; means for oscillating said rocker member, said rocker member feeling in its normal operative movements the peripheries of said gap disc and said notched disc; means for intermittently rotating said notched disc automatically; means for automatically positioning said mask member on said gap disc for initiating movements of increased amplitude of said rocker member at the end of months having less than thirty-one days, the extent of said increased movements being determined by said notched disc; together with means coacting with the driving pawl of said 33-tooth ratchet wheel for holding said pawl out of engagement with said ratchet wheel for part of each operative movement of said driving pawl.

17. In a date indicator the combination of a units numeral wheel having the figures 0, 1, 1, 2, 3, 4, 5, 6, 7, 8, 9 and a tens numeral wheel having the figures 1, 1, 1, 2, 2, 2, 3, blank, blank, for displaying the days of the month; gearing interconnecting the said units and tens numeral wheels, for effecting transfer of tens and also for effecting movements of said tens numeral wheel in addition to tens transfer; oscillating means for driving said displaying means; means for controlling the movement of said oscillating means; and means for periodically effecting an increased positive driving movement of said displaying means with normal movement of said oscillating means.

18. In a date indicator the combination of a units numeral wheel having the figures 0, 1, 1, 2, 3, 4, 5, 6, 7, 8, 9 and a tens numeral wheel having the figures 1, 1, 1, 2, 2, 2, 3, blank, blank, for displaying the days of the month; ratchet wheel means and driving pawl means for driving said displaying means; means for controlling the movement of said ratchet and pawl driving means; and means for periodically effecting an increased positive driving movement of said ratchet wheel means with normal movement of said driving pawl means.

19. In a date indicator the combination of a unit numeral wheel having the figures 0, 1, 1, 2, 3, 4, 5, 6, 7, 8, 9 and a tens numeral wheel having the figures 1, 1, 1, 2, 2, 2, 3, blank, blank, for displaying the days of the month; two ratchet wheels in fixed relation to each other for driving said displaying means; two driving pawls for said ratchet wheels; a rocker member carrying said driving pawls; means for oscillating said rocker member; means for controlling the amplitude of the oscillations of said rocker member; and means for raising one of said pawls out of engagement with its coacting ratchet wheel for part of its operative movement while the other pawl is in operative engagement with its ratchet wheel.

20. In a date indicator the combination of a unit numeral wheel having the figures 0, 1, 1, 2, 3, 4, 5, 6, 7, 8, 9 and a tens numeral wheel having the figures 1, 1, 1, 2, 2, 2, 3, blank, blank, for displaying the days of the month; gearing including mutilated wheels acting for tens transfer and also for movement of said tens numeral wheel in addition to tens transfer; ratchet wheel and driving pawl means for actuating said units numeral wheel; means for controlling the movement of said driving pawl means, said controlling means including a gap disc and a notched disc; and means for periodically effecting an increased movement of said ratchet wheel means with normal movement of said driving pawl means.

21. In a date indicator the combination of means for indicating the days of the month; ratchet wheel means in driving connection with said indicating means; a disc having a gap on its periphery, connected to said ratchet wheel means; a disc having notches on its periphery mounted independently of said ratchet wheel means; oscillating driving means for said ratchet wheel means, said driving means feeling in its normal operative movements the peripheries of said gap disc and said notched disc; together with means for intermittently rotating said notched disc.

22. In an indicator the combination of a rotatable display member; a toothed wheel attached to and movable with said display member; a mutilated wheel meshing with said toothed wheel; a snail having a lost motion connection with said mutilated wheel; a driving member rigidly connected to said snail; and a striking lever adapted to be tripped by said snail to operate said mutilated wheel.

23. In an indicator the combination of a display member; a toothed wheel attached to said display member; a one-tooth wheel gearing with said toothed wheel and provided with a pin; a snail having a slot forming with said pin a lost-motion connection with said one-tooth wheel; a drving member for said indicator rigidly connected to said snail; and a striking lever adapted to be tripped by said snail and strike said pin on said one-tooth wheel and cause said one-tooth wheel to operate said toothed wheel and said display member.

ROBERT ELMS.